(12) United States Patent
Greiner

(10) Patent No.: US 8,745,928 B2
(45) Date of Patent: Jun. 10, 2014

(54) LINING

(75) Inventor: Switbert Greiner, Oberaichen (DE)

(73) Assignee: Greiner & Gutmann GbR, Oberaichen (DE)

( * ) Notice: Subject to any disclaimer, the term of this patent is extended or adjusted under 35 U.S.C. 154(b) by 0 days.

(21) Appl. No.: 13/331,106

(22) Filed: Dec. 20, 2011

(65) Prior Publication Data

US 2012/0156420 A1    Jun. 21, 2012

(30) Foreign Application Priority Data

Dec. 21, 2010   (DE) .......................... 10 2010 055 462

(51) Int. Cl.
*E04B 2/00*   (2006.01)
*E04B 5/00*   (2006.01)
*E04B 9/00*   (2006.01)

(52) U.S. Cl.
USPC ........ 52/3; 52/506.01; 52/506.03; 52/506.04; 52/506.05

(58) Field of Classification Search
CPC .................. E04B 9/303; E04B 9/0407; E04B 2001/3241; E04H 15/00; E04H 15/18; E04H 15/20; E04H 15/22; E04H 15/34; E04H 15/36; E04H 15/40; E04H 2015/203
USPC ........... 52/3, 506.01, 506.03, 506.04, 506.05, 52/506.06, 506.07, 506.08, 506.09
See application file for complete search history.

(56) References Cited

U.S. PATENT DOCUMENTS

| 3,848,380 | A | * | 11/1974 | Assael | 52/222 |
| 3,909,994 | A | * | 10/1975 | Richter | 52/63 |
| 4,036,244 | A | * | 7/1977 | Huddle | 52/63 |
| 4,817,655 | A | * | 4/1989 | Brooks | 135/121 |
| 5,027,564 | A | * | 7/1991 | Lechner | 52/2.23 |
| 5,209,029 | A | * | 5/1993 | Foerst | 52/63 |
| 5,301,447 | A |   | 4/1994 | Lotter et al. | |
| 5,333,425 | A | * | 8/1994 | Nickerson et al. | 52/222 |
| 5,647,155 | A |   | 7/1997 | Hillstrom | |
| 6,324,797 | B1 | * | 12/2001 | Fago et al. | 52/222 |
| 6,789,978 | B1 | * | 9/2004 | Yoshinari | 403/381 |

(Continued)

FOREIGN PATENT DOCUMENTS

| DE | 2825173 A1 | 12/1979 |
| DE | 3631351 A1 | 2/1988 |

(Continued)

OTHER PUBLICATIONS

Righetti, European Patent Application EP 11 01 0012, European Search Report, May 8, 2012, 3 pages.

*Primary Examiner* — Mark Wendell
(74) *Attorney, Agent, or Firm* — Hoffman Warnick LLC

(57) ABSTRACT

A lining comprising at least two profiled frame elements extending in a longitudinal direction along the surface to be covered in spaced relationship to each other and at least one membrane element having a face side and a reverse side remote from the face side and disposed between the profiled frame elements and connected to the profiled frame elements, at least partially, by means of rearwardly engaging attachment means, wherein the membrane element, when in a loose state, is capable of moving freely in the longitudinal direction and, in particular, is free to move into and out of an space between the profiled frame elements. The lining further comprises means adapted to one-dimensionally or two-dimensionally taughten the membrane element in the transverse and longitudinal directions between the profiled frame elements.

15 Claims, 13 Drawing Sheets

(56) References Cited

U.S. PATENT DOCUMENTS

| | | | |
|---|---|---|---|
| 7,849,639 B2* | 12/2010 | Sprung | 52/82 |
| 2002/0035811 A1* | 3/2002 | Heuel | 52/506.05 |
| 2002/0152704 A1* | 10/2002 | Thompson et al. | 52/506.06 |
| 2003/0136073 A1 | 7/2003 | Arx et al. | |
| 2004/0074151 A1* | 4/2004 | Morris | 52/2.22 |
| 2004/0168383 A1* | 9/2004 | Reynolds et al. | 52/273 |
| 2005/0235592 A1* | 10/2005 | Scherrer et al. | 52/506.06 |
| 2007/0039250 A1* | 2/2007 | Morris | 52/22 |
| 2010/0037544 A1* | 2/2010 | Musgrave et al. | 52/222 |
| 2011/0061320 A1* | 3/2011 | Scherrer | 52/222 |

FOREIGN PATENT DOCUMENTS

| | | |
|---|---|---|
| DE | 4228721 A1 | 3/1994 |
| DE | 10253343 A1 | 5/2004 |
| DE | 102005035174 A1 | 2/2007 |
| EP | 0584730 A1 | 3/1994 |
| EP | 1452397 A1 | 9/2004 |
| FR | 1518396 A | 4/1967 |
| FR | 2753218 A1 | 3/1998 |
| FR | 2922919 A1 | 5/2009 |

* cited by examiner

LINING

The present invention relates to a lining for surfaces, more particularly ceilings or walls, as defined in the generic clause of claim 1.

Such a lining comprises at least two profiled frame elements extending in a longitudinal direction along the surface to be lined in spaced relationship to each other, and at least one membrane element having a face side and a reverse side remote from the face side and disposed between the profiled frame elements and joined to the profiled frame elements, at least partially, by means of attachment means capable of engaging an element in the direction from the rear of said element, i.e. rearwardly engaging attachment means, wherein the membrane element, when in a loose state, is capable of moving freely in the longitudinal direction and, in particular, is free to move into and out of a space between the profiled frame elements. The lining further comprises means adapted to taughten the membrane element in the transverse direction between the profiled frame elements.

A generic lining is disclosed in DE 10 2005 035 174 A1.

It may be regarded as an object of the invention to provide a lining which shows high functionality and provides an attractive room closure and which also requires little maintenance.

The object is achieved by a lining having the features defined in claim 1. Advantageous embodiments and variants of the lining of the invention are described in the dependent claims and are also explained in the following description, particularly with reference to the figures.

The lining of the above type is, according to the invention, characterized in that at least one dimensionally stable protective cover is provided for protection of the membrane element from, in particular, soiling on the reverse side.

A first fundamental concept of the invention may be regarded as being the provision of a lining in the form of an integrated system comprising a flexible membrane element on a face side and a rigid protective cover on a reverse side.

The membrane element on the face side, which can comprise, for example, a textile membrane, can provide an attractive room closure having pleasant optical and haptical properties. In the installed state of the lining, the membrane element is stretched between the profiled frame elements. The stretched state causes the membrane element to resist the stresses arising from, say, contact therewith or from colliding objects.

On the one hand, the protective cover increases the protection for persons thrown against the ceiling by any turbulence that might occur and, on the other hand, it protects sensitive components on the interior surface of the fuselage from damage caused by collisions.

The membrane element extends preferably as a single unit without abutments or segmentation over the entire width and length of the surface to be lined. In a preferred embodiment, the membrane element has a width of up to approximately 1.5 m and a length of more than 20 m.

Another fundamental concept of the invention may be regarded as being the provision of protection of the reverse side of the membrane element, which may be sensitive to dirt and/or water.

The protective cover of the invention can protect the membrane element especially from soiling by dust. Furthermore, the protective cover can also protect the membrane from drops of water that are produced by condensation and can form on the surface to be lined. Such formation of condensation water can, for example, occur on an inner surface to be lined in a passenger aircraft. Due to the protective cover provided on the reverse side of the membrane element, it is thus possible to use a textile membrane as a lining, particularly as a ceiling lining in a passenger aircraft.

By a dimensionally stable protective cover is meant, in particular, a substantially rigid or stiff cover, which, compared with the membrane element, is not, or only very slightly, flexible.

Due to the fact that the protective cover is in the form of a dimensionally stable protective cover, it can take on a number of other functions in addition to said protection and serve, in particular, as a support for various elements such as illuminants or reflectors. Thus the lining is highly functional regarding various additional aspects in addition to offering simple coverage of the surface to be lined. The lining of the invention can therefore be regarded as an integrated solution combining various functions in a significantly more compact manner than would be the case with individual components.

In particular, when used in an aircraft, the protective cover can consist of a light-weight liner of, say, a sandwich construction comprising honeycombs of aramide or aluminum as core material.

For the purpose of producing an optically particularly attractive lining, the protective cover has, in a preferred embodiment, at least one illuminant and preferably a plurality of illuminants. The illuminants are preferably disposed on that side of the protective cover which faces the membrane element and can thus illuminate the membrane from its reverse side. The illuminants can, in particular, be in the form of a field of light-emitting diodes. They can be monochrome or in the form of RGB emitters (red-green-blue emitters). In particular, colored illuminants such as RGB emitters can project luminous colors onto the membrane element.

By means of such back lighting of the membrane element it is possible to produce uniform illumination on its face side. To achieve this, the membrane element preferably comprises photometric materials, more particularly a photometric fabric which efficiently diffuses translucent light but still has good translucent properties. In this case, a transmittance of from 70 to 90%, more particularly approximately 80%, is advantageous. The photometric material is preferably non-transparent.

In another preferred embodiment, the protective cover has at least one reflector. The reflector is preferably mounted on a side of the protective cover facing the membrane element or is formed by the protective cover itself, for example, when the latter is of aluminum. The reflector can have mirrored surfaces. By means of the reflector, it is possible for light incident from the side, for example coming from laterally mounted illuminants, to be reflected in the direction of the membrane element. In a preferred variant, the reflector has a stepped reflector surface, in order to reflect laterally incident light uniformly onto the membrane element.

The application possibilities of the lining can be further increased in that the protective cover has at least one heat sink. In particular, the protective cover can itself form the heat sink. The heat sink can, in particular, serve the purpose of dissipating heat from illuminants which may be mounted on, or near to, the protective cover.

In another advantageous embodiment, the protective cover has a sound-absorbing coating or layer. This can, particularly in conjunction with a sound-absorbing fabric of the membrane element, lead to efficient sound absorption.

The membrane element can, in the unstrained state, be moved substantially force-free or loosely along the profiled frame elements. To this end, it is preferred, according to the invention that said fastening means capable of engaging from behind are formed by a keder joint. The membrane element can, for example at least along its long sides, have in each case a keder, that is to say, a reinforced edge, which is capable of being coupled with a keder groove formed in the profiled frame elements. The bordering keders of the membrane element are preferably capable of being threaded into the keder grooves in the longitudinal direction of the membrane element.

In another preferred embodiment, the membrane element also has corresponding keders on the transverse sides for introduction into transverse keder grooves.

In another preferred variant of the invention, the protective cover is fixed to the profiled frame elements. Attachment is preferably effected at regular intervals along the longitudinal axis of the lining. Due to the fact that the protective cover is directly attached to the profiled frame elements, there is no need for separately fixing the protective cover to the surface to be lined. The lining thus forms a unit, which can be mounted to the surface to be lined in a simple manner using only a few attachment means.

In an advantageous development of the invention, provision is made to the effect that securing elements are provided with which the profiled frame elements can be attached to an installation base. Thus the lining can, in particular, be suspended on the installation base exclusively via the profiled frame elements.

Tensile forces which may be transferred by the stretched membrane element to the profiled frame elements can, in another preferred embodiment of the invention, be directed into or absorbed by the installation base via the securing elements. The protective cover can be substantially relieved of tensile forces in this embodiment such that they need not be subjected to any particular stability or rigidity demands.

In an alternative embodiment, provision is made to the effect that tensile forces which are transferred from the stretched membrane element to the profiled frame elements can be directed into or absorbed by the protective cover. The advantage of this solution is that the tensile forces in the membrane element can be absorbed by the protective cover. The installation base, for example the aircraft structure on which the lining can be mounted, only needs to bear the forces derived from its own weight and mass forces. Thus the installation base, i.e. said aircraft structure, is eased.

In particular, when the lining is of considerable length, the protective cover may comprise a plurality of cover segments, which may especially be positively joined to each other. In the border regions of the individual cover segments, upturns can be provided, for example, which can each be positively joined to each other. For example, the upturns can be configured such that a first upturn of a first cover segment can form a U-shaped overlap over a second upturn of an adjacent second cover segment. This ensures that the joint is impermeable to dust and condensed water. In addition, the upturns provide the protective cover with rigid edges.

Particularly in the case of long linings, it is preferred that the profiled frame elements each consist of a plurality of profiled segments that are joined together particularly in the region of a moment zero point of the profiled frame elements. Thus the installation seams of the profiled segments are disposed at the moment zero points of the profiled frame elements acting as continuous beams. It is then necessary to transfer substantially only transverse forces in the installation seams. Joining the individual profiled segments to each other can, for example, be carried out by screwing, for example using metal butt straps. In order that the keder groove formed in each of the profiled frame elements cannot be offset in the installation seam, the metal butt straps are preferably configured such that a positive fit is enforced.

The membrane element is preferably capable of being taughtened in two directions in space. The process of taughtend the membrane element biaxially can make the membrane element resiliently resistant to any occurring loads and capable of returning to its original shape on removal of a load. In addition, a crease-free and smooth membrane element can be provided. For the purpose of biaxially stretching the lining, it preferably has means for stretching the membrane element in the longitudinal direction and means for stretching the membrane element in the transverse direction.

A very simple way of stretching the membrane element in the transverse direction can be achieved in that the membrane element has as taughtening means at least one zip fastener that extends in the longitudinal direction and that the state of the membrane element can be changed, by closing the zip fastener, from a loose state to a state in which it is taught in the transverse direction and, by opening the zip fastener, from a taught state in the transverse direction to the loose state.

In this embodiment, the membrane element comprises, in particular, a textile membrane, for example a fabric, and at least one zip fastener, which is attached to the membrane. The zip fastener has a first closure band and a second closure band, on each of which can be formed from strip of fabric. The first closure band is attached to the membrane, and is more particularly welded, glued, or sewn thereto. The second closure band has a keder attached thereto. The keder can be of a plastics material and is preferably extruded onto or injection molded onto the se-cond closure band. This injection molding or extrusion can take place during the production of the zip fastener. The injection molding or extrusion produces a particularly strong bond between the closure band and the keder, which withstands any tensile forces. Moreover, said extrusion makes it possible to maintain very small tolerances.

In addition to the possibility of taughtening the membrane element, the zip fastener provides a simple access to the protective cover, for example for inspection purposes or for installing or removing illuminants. For the purpose of completely removing the membrane, it is advantageous to provide at least one zip fastener on each of the two long sides of the membrane.

For the purpose of taughtening the membrane element in the longitudinal direction, the membrane element can also have at least one zip fastener on each of the transverse sides. In an advantageous embodiment of the membrane element, it accordingly has at least one zip fastener in the longitudinal direction and at least one zip fastener in the transverse direction. More preferably, each of the edges of the membrane element has at least one zip fastener disposed thereon.

Taughtening of the membrane element is facilitated in that a connecting strap is disposed across the zip fastener, by means of which a gap of the zip fastener when it is open is restricted. In other words, the connecting strap ensures that the closure bands are prevented from moving away from each other completely or to an arbitrary extent, despite the fact that the zip fastener is open. The connecting strap keeps the membrane connected to the second closure band, even when the zip fastener is open. The restriction of the distance between the two closure bands makes it possible to close the zip fastener in a simple manner. The connecting strap is preferably attached to both closure bands, for example, is welded, glued, or sewn thereto. The connecting strap can be in the form of a strip of fabric. During installation, the connecting strap ensures that the membrane can be readily inserted in a loose state when the zip fastener is open.

The desired effect of the connecting strap involving the restriction of the distance between the two closure bands can also be attained by sewing on the closed zip fastener in such a manner that the membrane forms a bulge along the zip fastener that corresponds to that of the connecting strap.

Thus, instead of using a separate connecting strap, the desired effect can be attained by a special method of attaching the tension zip fastener to the membrane. In this case, the membrane has in its attached state a bulge, which runs parallel to the tension zip fastener. The connecting strap and the membrane can thus be one and the same piece of material. The connecting strap and the membrane can accordingly be in the form of a single unit or integral with each other. The connecting strap can be an integral component of the membrane.

In another preferred embodiment, at least two zip fasteners are provided, which zip fasteners are arranged in relation to each other such that closing a first zip fastener produces a loose, closed, or pretensioned state of the membrane element and subsequent closing of a second zip fastener produces its taughtened state. Thus, at the position of the aforementioned connecting strap, there is provided another zip fastener, which is referred as the first zip fastener. When first zip fastener is closed and the second zip fastener is open, the distance between the closure bands of the second zip fastener is restricted.

Preferably, the said two zip fasteners are disposed at one and the same border region or in a central region of the membrane element and can also be referred to collectively as a double zip fastener. The two zip fasteners are disposed in relation to each other perpendicularly to the surface of the membrane. Thus not more than one of the zip fasteners is located in the plane of the membrane, while the second zip fastener is located away from the membrane plane The membrane element can be substantially force-free or loosely inserted into the keder grooves of the profiled frame elements when the first zip fastener is closed and the second zip fastener open. A gap is formed between the closure bands of the second zip fastener having a width restricted by means of the first zip fastener. Following the introduction of the membrane element into the keder grooves, it can be stretched by simply closing the second zip fastener.

The use of a zip fastener instead of the connecting strap combines the advantages of simple taughtening and easy access to the protective cover. Thus the two zip fasteners on the one hand provide a very simple means of taughtening starting from the closed first zip fastener and, on the other hand, provide a simple access to the protective cover and further components situated behind it by opening both zip fasteners.

Basically, due to the use of the zip fastener(s), it is possible to taughten the membrane element without necessitating any movement of the profiled frame elements. Thus the profiled frame elements can be in the form of fixed, i.e. substantially immovable border elements. Alternatively, it is possible, for the purpose of assisting and increasing the degree of taughtness, to configure the profiled frame elements so as to be displaceable transversely to the longitudinal axis thereof.

In another preferred embodiment of the invention provision is therefore made to the effect that the means for taughtening the membrane element comprise at least one adjusting device with which at least one of the profiled frame elements can be displaced in the transverse direction. The membrane element can accordingly be alternatively or additionally taughtened in that the distance between the profiled frame elements is increased. Said adjusting means can also be used for the purpose of adjusting the stretched membrane element.

The protective cover preferably includes a corrugated sheet or plate or a frame which is covered with a foil or membrane. The protective cover preferably includes a convex upper surface, so that water can be drained off to the sides. Side edges of the protective cover are preferably formed as drip edges.

The invention is further described below with reference to preferred exemplary embodiments which are illustrated in the attached diagrammatic drawings. in which.

Figure 1:
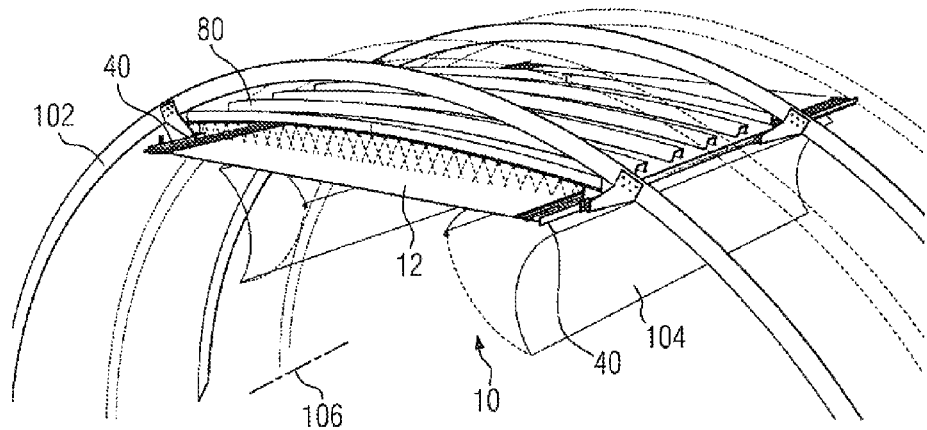
FIG. 1 is a perspective view of a first embodiment of a lining of the invention.

A first embodiment of a lining 10 of the invention is illustrated in FIGS. 1 to 4. The lining 10 is installed in the interior of an aircraft on the ceiling of a passenger compartment representing a surface 110 to be lined. In the case of the embodiment illustrated in FIGS. 1 to 4 the lining 10 is fixed to luggage racks 104 of the aircraft on a possibly already existing support for an exchangeable aircraft ceiling.

Like components are provided with like reference signs in all figures.

The lining 10 comprises as essential component a membrane system consisting of two opposing and parallel profiled frame elements 40, between which a membrane element 12 is spanned. Furthermore, the lining 10 comprises a flat protective cover 80 disposed near to and substantially parallel to the membrane element 12.

Figure 3:
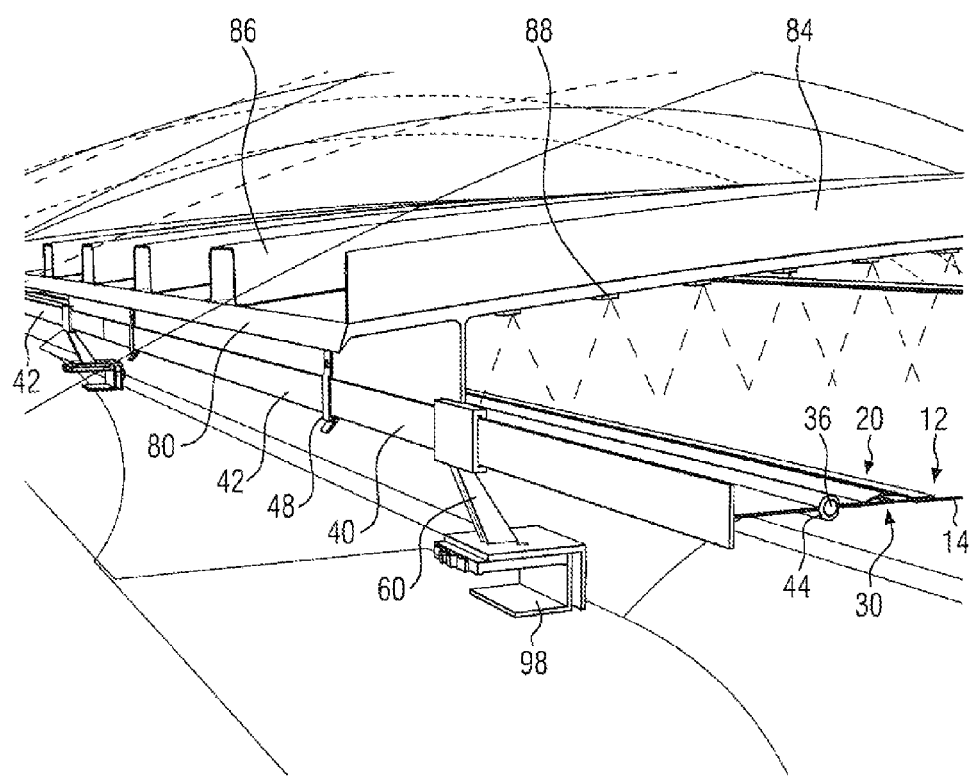
FIG. 3 is a perspective detailed view of the first embodiment as seen from outside.
Figure 4:
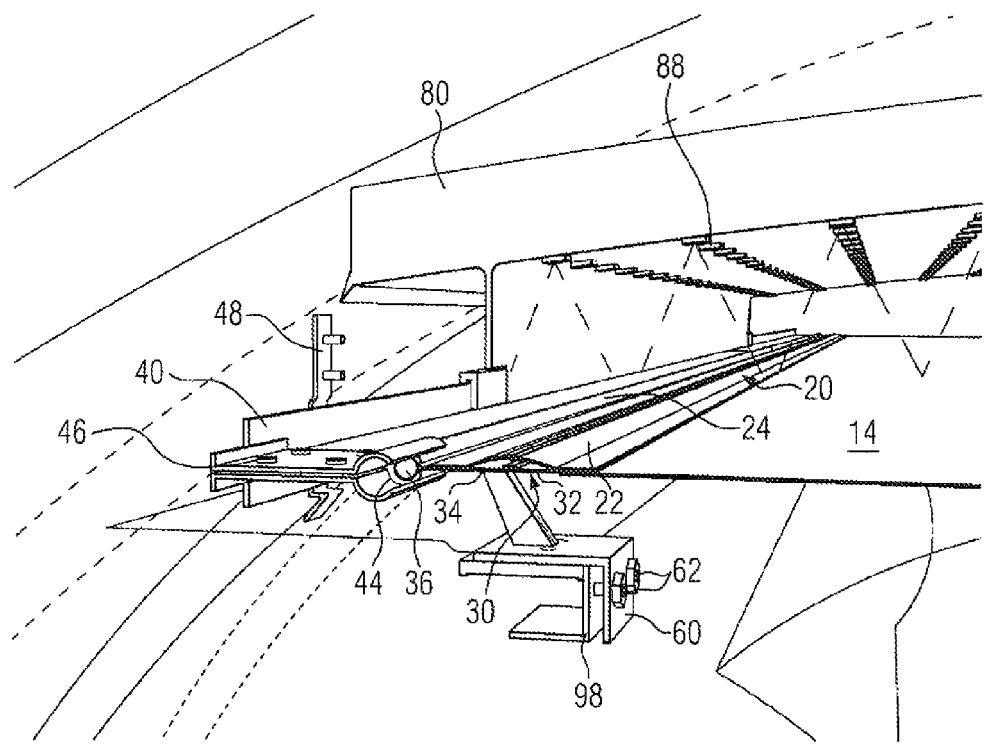
FIG. 4 is a detailed perspective view of the first embodiment, as seen from inside.
Figure 5:
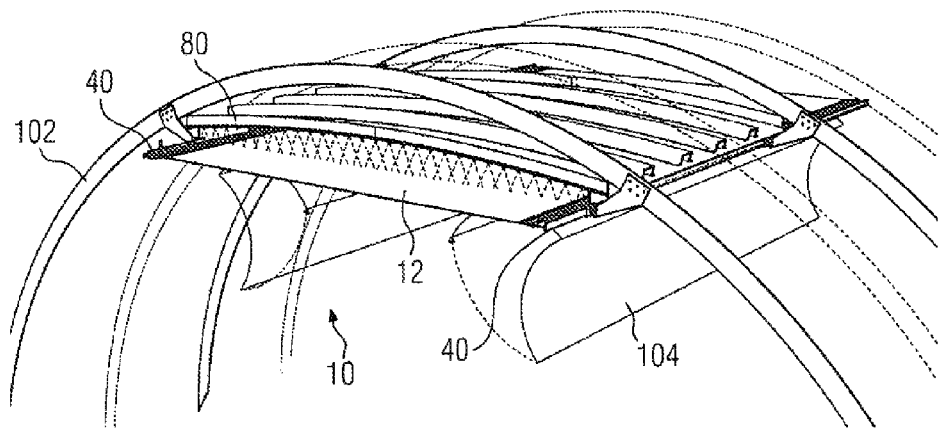
FIG. 5 is a perspective view of a second embodiment of a lining of the invention.
Figure 6:
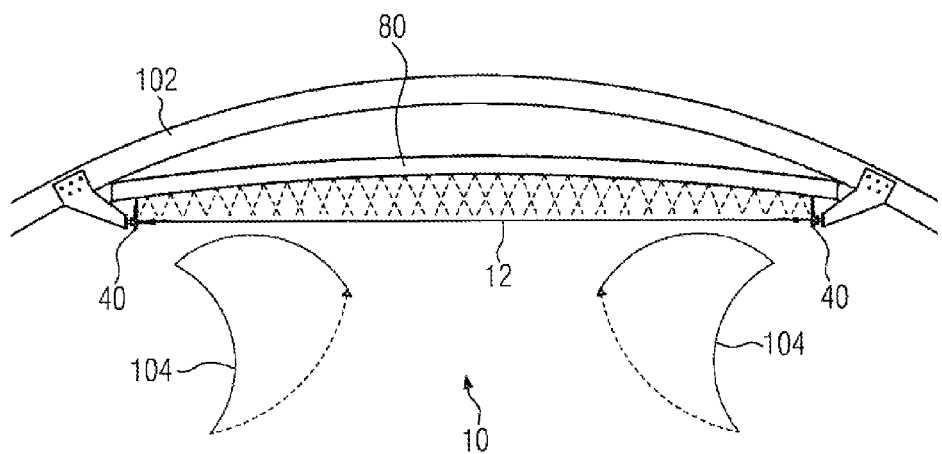
FIG. 6 is a front view of the second embodiment.
Figure 7:
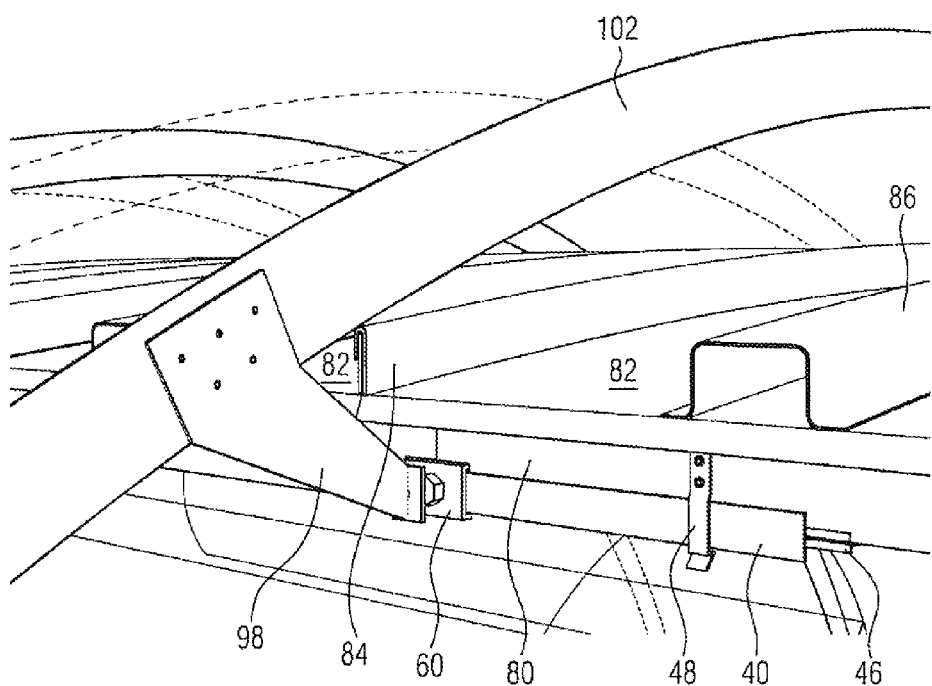
FIG. 7 is a detailed perspective view of the second embodiment, as seen from outside.
Figure 8:
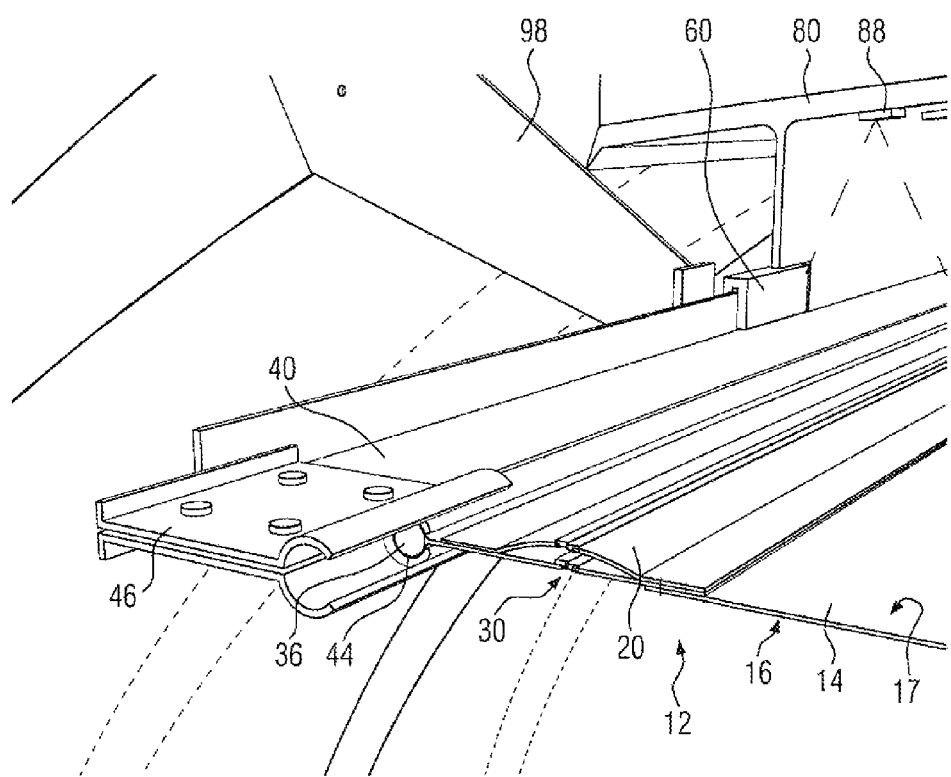
FIG. 8 is a detailed perspective view of the second embodiment, as seen from inside.

The profiled frame elements 40 each have a T-shaped cross-section with a transverse land and a central longitudinal land, as can be seen, in particular, in FIGS. 3 and 4. At the end of the central longitudinal land of the T-shaped profiled frame element 40 there is provided a keder groove 44 to form a rearwardly engaging profile. The profiled frame elements 40 and the keder grooves 44 extend in the longitudinal direction 106 of the lining 10 and of the aircraft and can also be referred to as profiled rails or keder rails. The elements in the transverse direction can be configured in a similar manner.

The profiled frame elements 40 are attached at regular intervals to the surface to be lined, more particularly to a mounting base 98 by means of fixing elements 60. The mounting base 98 is formed by several bearing elements that are disposed below the lining 10 and that form the support for the lining 10.

The profiled frame elements 40 are attached to the mounting base 98 and/or to the fixing elements 60 in that they are fixed only at one point in the longitudinal direction 106, and are otherwise mounted for sliding in the longitudinal direction 106. In this way, linear deformation of the aircraft fuselage that can take place under various flight conditions does not strain the profiled frame elements 40.

With regard to cramped conditions that may possibly exist during installation, it may be meaningful to restrict the length of the profiled frame elements 40. For this reason, the profiled frame elements 40 are divided to form a plurality of profiled segments 42 that are joined together so as to align with each other thus forming the complete profiled frame element 40. Any resulting installation seams are preferably disposed at the moment zero points of the profiled frame elements 40 acting as continuous beams. Connecting members 46 are provided for joining the individual profile segments 42. The connecting members 46 are shaped such that a positive connection of the profile segments 42 is enforced. In this way, the profile segments 42 are prevented from becoming misaligned.

The connecting members 46 each comprise two joint plates which are parallel to each other and between which the profile segments 42 can be clamped. The connecting members 46 likewise comprise a groove-like recess extending around the keder groove 44 of the profiled frame element 40.

The membrane element 12 comprises a textile membrane 14 and a single or double zip fastener 30 disposed along the long edges of the membrane. For the purpose of attaching the membrane element 12 to the profiled frame elements 40, a keder 36 is provided along each of the lateral border regions of the membrane element 12, which keder can be threaded into the keder grooves 44 on the profiled frame elements 40 in the longitudinal direction 106.

The zip fasteners 30 extend in the longitudinal direction 106 of the lining and of the membrane element 12 and are parallel to the keder 36. The zip fasteners 30 can be closed for the purpose of taughtening the membrane element 12 or the membrane 14 and opened for the purpose of slackening it. The zip fasteners 30 each comprise a first closure band 32 and a second closure band 34. The first closure band 32 is permanently joined to the membrane 14. The keder 36 for insertion into the keder groove 44 is attached to the second closure band 34.

The zip fasteners 30 permit simple installation and simple closing and opening of the membrane element 12 while furthermore, taughtening of the membrane element 12 can take place at the same time as the zip fasteners are closed. At the same time the keder, with its sliding movements in the keder groove 44, allows a uniform and biaxial taughtening. Taughtening of the membrane element 12 in two directions inevitably leads to expanding movements of the membrane element 12 in two directions, which necessarily take place at the borders of the membrane element also, in order to achieve the desired biaxially stretched state.

Figure 16:
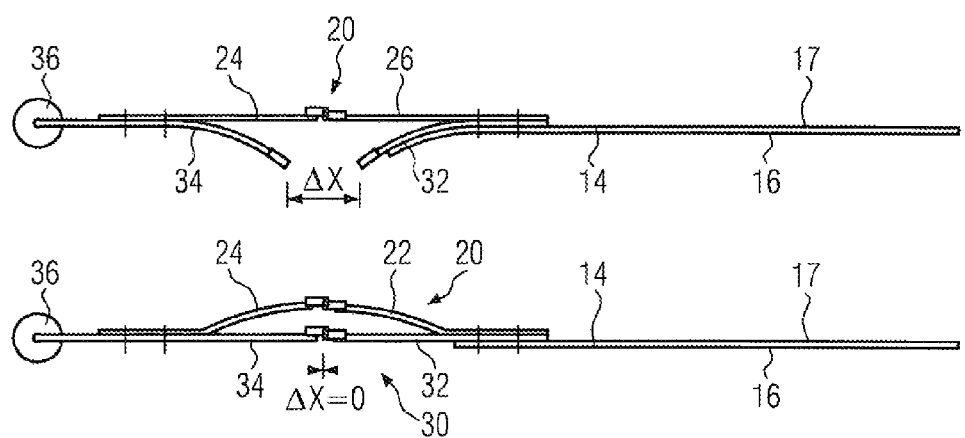
FIG. 16 is a cross-sectional view of a membrane element having a double zip fastener in partially opened and closed states.

In the embodiment shown, each of the long sides of the membrane 14 has two zip fasteners 20, 30. The zip fasteners 20, 30 may be collectively referred to as double zip fasteners. The zip fasteners 20, 30 are disposed not side by side in the plane of the membrane but vertically adjacent to each other or on top of each other. Details of the double zip fastener are shown in FIG. 16.

A first zip fastener 20 comprises a first closure band 22 and a second closure band 24. The first zip fastener 20 defines a maximum width of the membrane element 12 that allows said membrane element to be readily threaded or inserted into the keder grooves 44 without being subjected to transverse stresses. When the first zip fastener 20 is closed and the second zip fastener 30 is open, the membrane element 12 is mainly loose and thus in an unstressed or only slightly taughtened state. In this state, there is a gap Δx between the closure bands 32, 34 of the second zip fastener 30. Thus the membrane element 12 can be attached with particular ease to the profiled frame elements 40 in this state by inserting the keder 36 into the keder grooves 44 on the profiled frame elements 40. Before the membrane element 12 is taughtened, the gap Δx typically ranges from approximately 0.5 to 1.0% of the width of the membrane element.

After threading in the membrane element 12 and optionally applying a longitudinal bias, the gap is removed by closing the second zip fastener 30, by which means the membrane element 12 or the membrane 14 is made taught. Unlike the first zip fastener 20, the second zip fastener 30 is disposed such that the first zip fastener 20 is relieved of tension when the second fastener 30 is closed. In this state, the first zip fastener 20 can bulge upwardly, as can be seen in the figures, more particularly in FIG. 16.

Both zip fasteners 20, 30 can be opened and closed again for inspection purposes. The first zip fastener 20 may be referred to as an access zip fastener, and the second zip fastener 30 as taughtening fastener. The first zip fastener 20 is disposed on top of the second zip fastener 30. The second zip fastener 30 is embedded in the keder 36 and permanently attached thereto for the transfer of taughtening forces.

Figure 17:
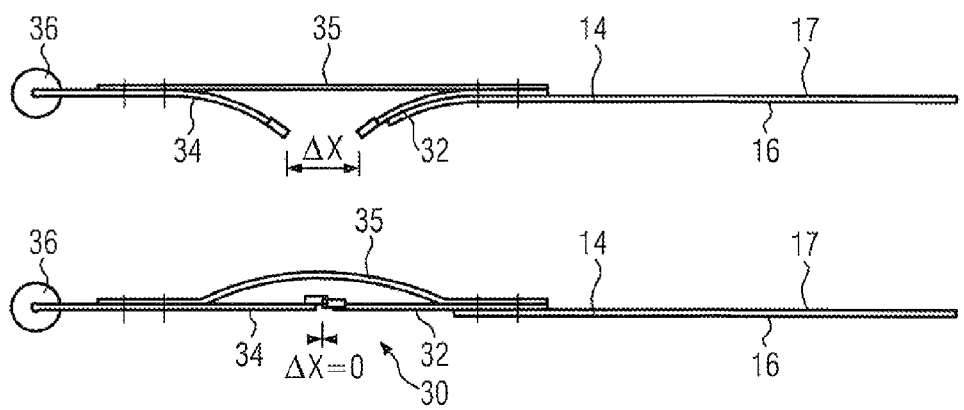
FIG. 17 is a cross-sectional view of a membrane element having a zip fastener and a connecting strap in open and closed states.

A further embodiment of a zip fastener is shown in FIG. 17. In place of the double zip fastener shown in FIG. 16, there is provided a second zip fastener 30, around which there is disposed a connecting strap 35. The connecting strap 35 joins the two closure bands 32, 34 of the zip fastener 30. The gap Δx of the open zip fastener 30 is restricted by the connecting strap 35. The connecting strap 35 can be made of, say, a textile strip that is permanently connected to the two closure bands 32, 34. To this end, the connecting strap 35 can be sewn or welded onto the closure bands, for example. As shown in FIG. 17, the connecting strap 35 is preferably attached to the reverse side 17 of the membrane element 12 so that it is hardly visible when the zip fastener 30 is closed. When the zip fastener 30 is closed, the connecting strap is loose or relieved of tension and it can bulge upwardly relatively to the membrane surface.

The same effect can alternatively be achieved by appropriately sewing a pre-bulged membrane 14 above the taughtening zip fastener 30. Instead of the connecting strap 35, the zip fastener 30 can thus be sewn directly onto the pre-bulged membrane 14 disposed above the zip fastener 30.

In the exemplary embodiment shown, adjusting means 62 are provided for the purpose of effecting additional stretching and/or of adjusting the tension of the membrane element 12 and also for the purpose of moving at least one of the profiled frame elements 40 in a transverse direction 108. Thus the distance between two profiled frame elements 40 can be altered by actuating the adjusting means 62. The adjusting means 62 are, in the embodiment shown, in the form of adjusting screws. The adjusting means 62 can move the profiled frame elements 40, in particular, relatively to the mounting base 98 in the transverse direction 108.

A protective cover 80 made, in particular, of light metal is provided above the membrane element 12 and at a distance from the same. The protective cover 80 extends between the membrane element 12 and the surface 110 to be lined, i.e., a top region of the aircraft fuselage. The protective cover 80 covers an area that is larger than that of the membrane element 12. Specifically, the protective cover 80 protrudes laterally beyond the membrane element 12 and the profiled frame elements 40 disposed along the lateral borders of the membrane element 12.

Particularly for draining off condensation water that may possibly form on a top surface of the lining 10, the protective cover 80 has an arched or curved cross-section. Thus, due to the curvature of the protective cover 80, condensation water that may form on the top surface of the protective cover 80 can flow off to the sides without coming into contact with the membrane element 12.

Furthermore, the protective cover 80 can also comprise a number of cover segments 82 that are joined together to form the complete cover 80. One way of joining the individual cover segments 82 to each other consists in the provision of upturns 84 at appropriate border regions along the edge of the individual cover segments 82, each upturn of a cover segment 82 being adapted to engage behind or around an upturn of an adjoining cover segment 82. To this end, each upturn 84 can be U-shaped for example.

For the purpose of stiffening the protective cover 80, stiffening elements 86 can be provided that can extend, in particular, in the transverse direction 108 of the protective cover 80.

Figure 2:
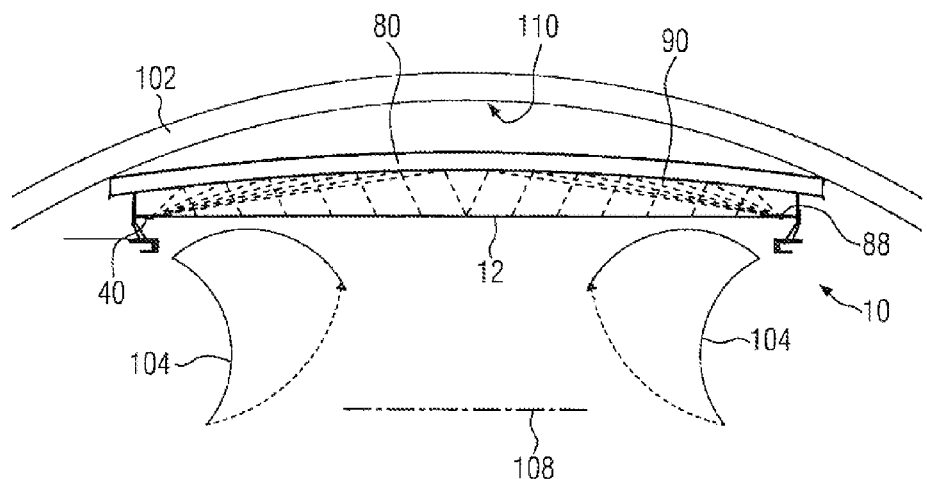
FIG. 2 is a front view of the first embodiment.

The protective cover 80 can comprise a plurality of illuminants 88, for example light emitting diodes, on its underside, or the internal surface near to the membrane element 12, as shown in FIGS. 1, 3, and 4, for example. The illuminants 88 emit light toward the membrane element 12 or the membrane 14, at which the light is scattered. For this purpose, the membrane 14 can be of a photometric fabric. Alternatively, illuminants 88 can also be provided at the edge regions of the lining, more particularly on the profiled frame elements 40, as shown in FIG. 2. The protective cover has a reflector 90 on its underside or internal surface for the purpose of reflecting the light radiated laterally in this way.

The protective cover 80 is attached to the profiled frame elements 40 by means of fixing elements that are formed by clasps 48 in the embodiment shown. The clasps 48 can be screwed, riveted or glued to the protective cover 80. The profiled frame elements 40 can be connected to the clasps 48 by means of a releasable snap-on connection for the purpose of facilitating installation.

A second embodiment of a lining 10 of the invention is illustrated in FIGS. 5 to 8. The second embodiment differs from the first embodiment in that the lining 10 is not attached to support points above the luggage racks 104 in the interior of the aircraft, but is instead attached to the aircraft fuselage itself. The lining 10 can be attached particularly to the frame 102 of an aircraft. For this purpose, there are provided C-shaped retaining elements that form a mounting base 98 for the lining 10. As described with reference to FIGS. 1 to 4, the profiled frame elements 40 are movable relatively to the mounting base 98.

Preferably, the membrane element 12 is a one-piece component and is threaded as a unit by means of its keder into the keder grooves of the profiled frame elements 40. Thus, unlike the profiled frame elements 40 and the protective cover 80, the membrane element 12 is preferably not segmented.

Figure 9:
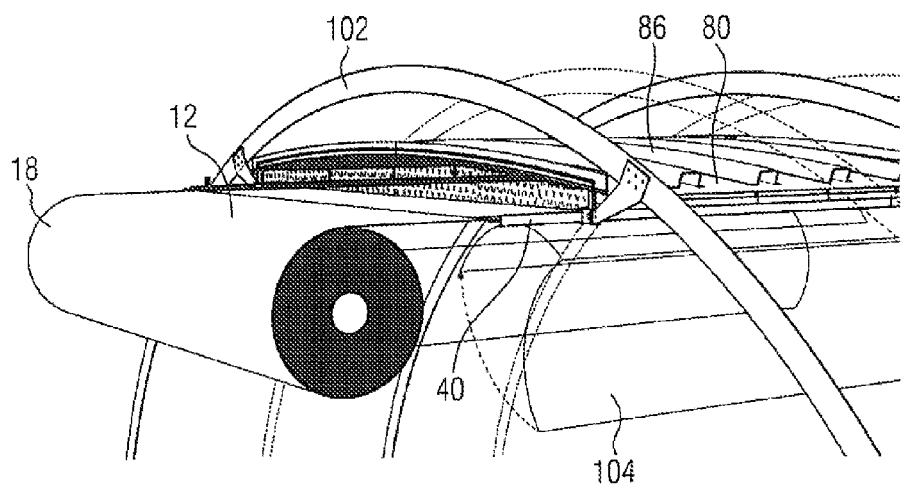
FIG. 9 is a perspective view of a third embodiment of a lining of the invention.

Particularly when the membrane 14 cannot be completely removed from the keder 36 by means of the zip fasteners 30 provided, it is advantageous to roll up the membrane element 12 on a roll 18, as shown in FIG. 9, in order to enable the membrane element 12 to be removed and threaded in a simple manner.

Figure 10:
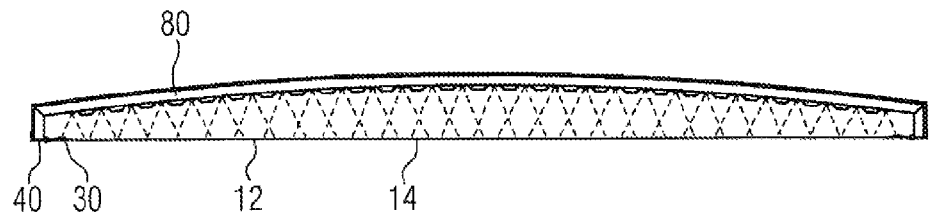
FIG. 10 is a front view of a fourth embodiment of a lining of the invention.
Figure 11:
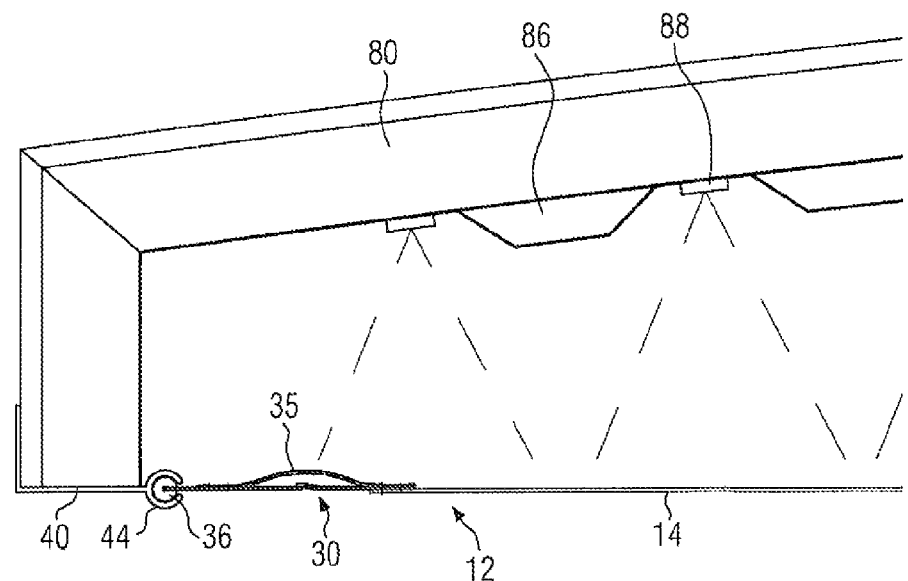
FIG. 11 shows a detail of the fourth embodiment.

A third example of a lining 10 of the invention is shown in FIGS. 10 and 11. Unlike the first two embodiments, taughtening forces that are transferred from the membrane element 12 to the lateral profiled frame elements 40 are transmitted directly to the protective cover 80 in this variant. To this end, the profiled frame elements 40 are connected permanently to the protective cover 80. The protective cover 80 is configured to be very stiff for the purpose of absorbing the taughtening forces.

In this embodiment, the protective cover 80 can be mounted and dismounted as a complete unit. In order to achieve the necessary stiffness, the protective cover 80 can be provided with stiffening elements 86 or ribs that can absorb the taughtening forces from the membrane element 12 at least partially and preferably completely. The room closure of the protective cover 80 and the cohesion of the ribs can be ensured by means of a thin, cylindrical shell. For example, the shell can be made of sheet metal comprising stiffening ribs.

Furthermore, FIG. 11 shows an embodiment of the zip fastener comprising a connecting strap 35.

FIGS. 12 to 18 illustrate details of the membrane element 12 and the taughtening process.

Figure 12:
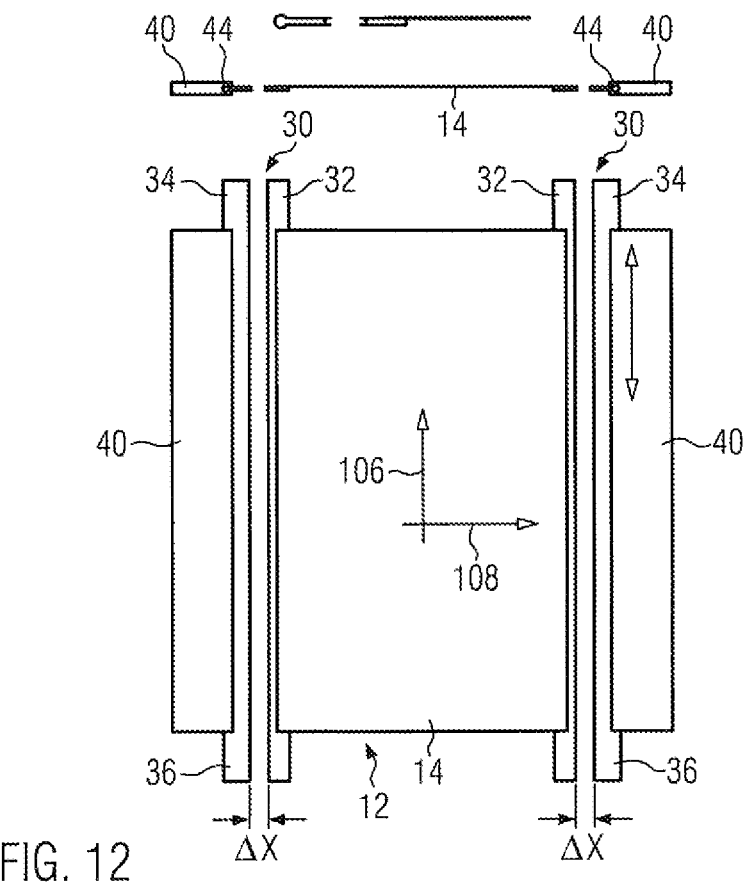
FIG. 12 is a top view of a membrane element and a profiled frame element with the zip fasteners in the opened state.

FIG. 12 shows a membrane element 12 comprising a membrane 14 and two zip fasteners 30, each of which is open. The zip fasteners 30 each comprise a first closure band 32 and a second closure band 34. The first closure band 32 is welded or sewn to the membrane 14. The second closure band 34 of the zip fastener 30 comprises a keder 36 that is inserted into a keder groove 44 of a profiled frame element 40.

Figure 13:
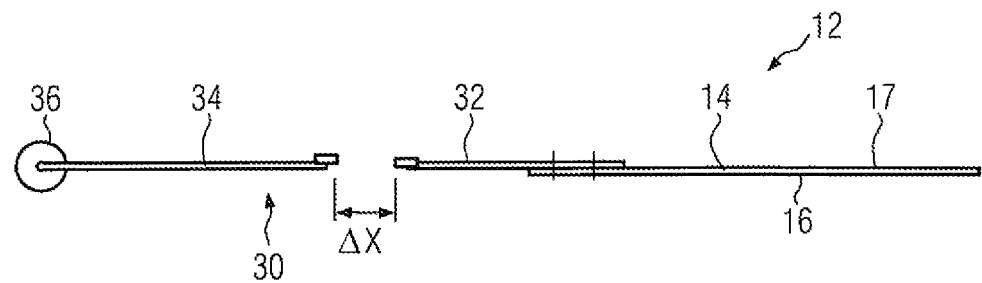
FIG. 13 is a cross-sectional view of a membrane element with the zip fastener in the opened state.

The membrane 14 is in a slack state, and between the first closure band 32 and the second closure band 34 there is in each case a gap $\Delta x$. A cross-sectional view of the zip fastener 30 is shown in FIG. 13. The second closure band 34 of the zip fastener 30 is embedded in the keder 36 and securely and positively attached thereto.

Figure 14:
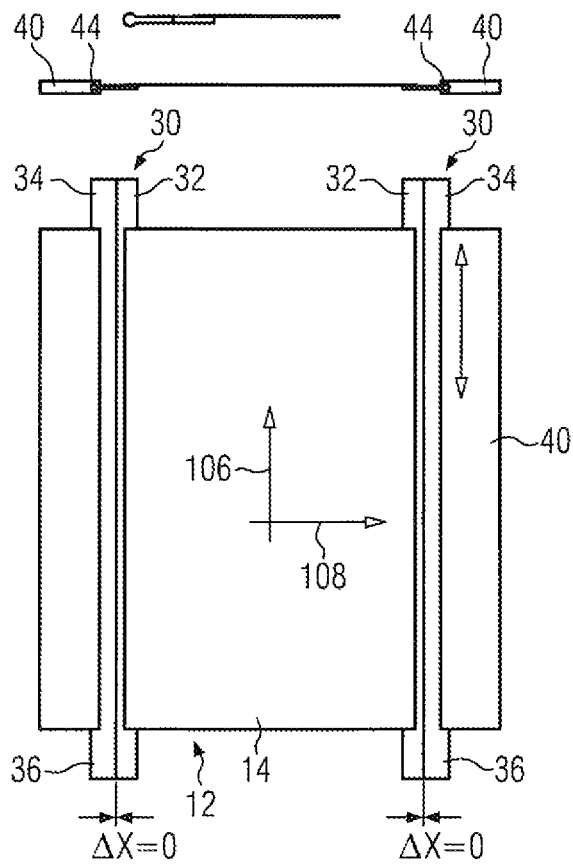
FIG. 14 is a top view of a membrane element and a profiled frame element with the zip fasteners in the closed state.
Figure 15:
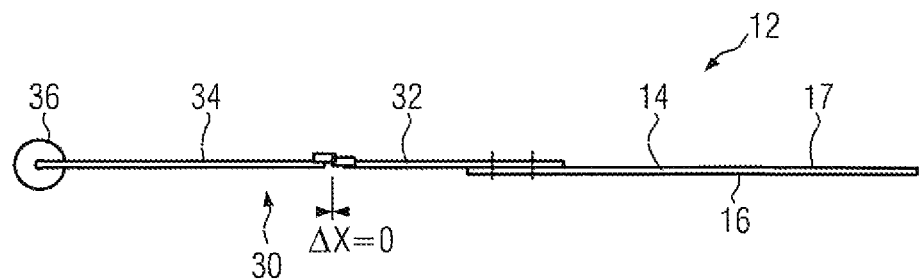
FIG. 15 is a cross-sectional view of a membrane element with the zip fastener in the closed state.

The membrane 14 is shown in a taughtened state in FIG. 14. To this end, the zip fasteners 30 are closed and there is no longer a gap between the closure bands. The membrane 14 is taughtened in the transverse direction 108. Despite the taughtened state, the membrane 14 can still be moved in the longitudinal direction 106 along the profiled frame elements 40. In other words, the keders 36 are axially movable in the keder grooves 44. A cross-sectional view of the zip fastener 30 in the closed state is shown in FIG. 15.

Figure 18:
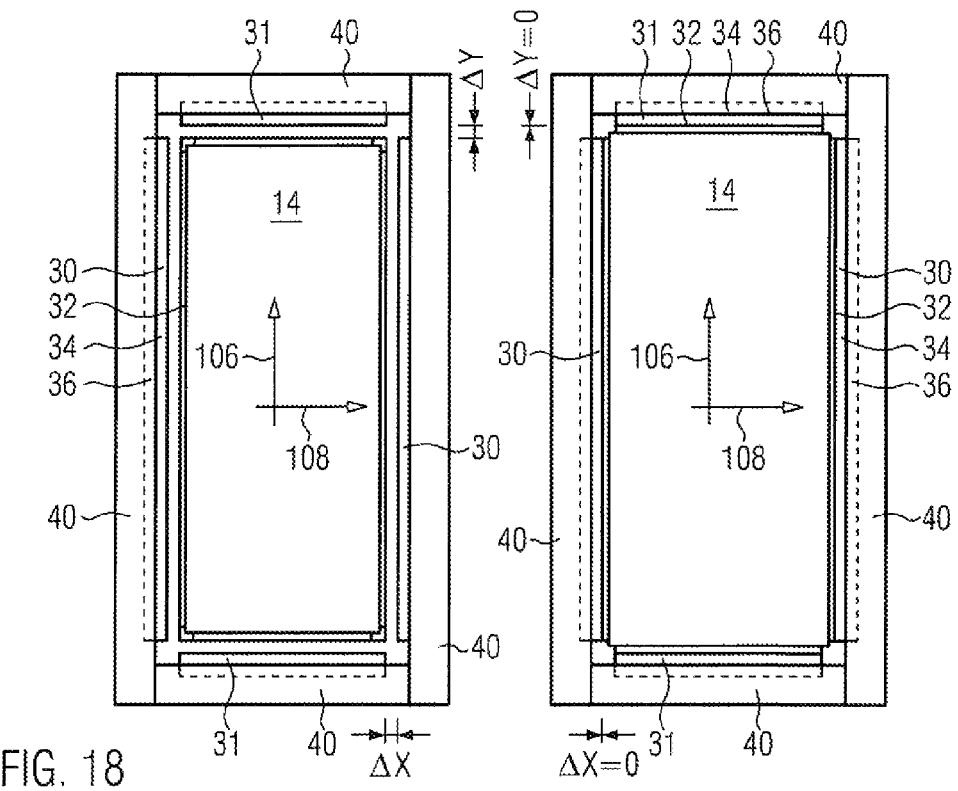
FIG. 18 is a top view of lining having a membrane element taughtened in two directions.
Figure 19:
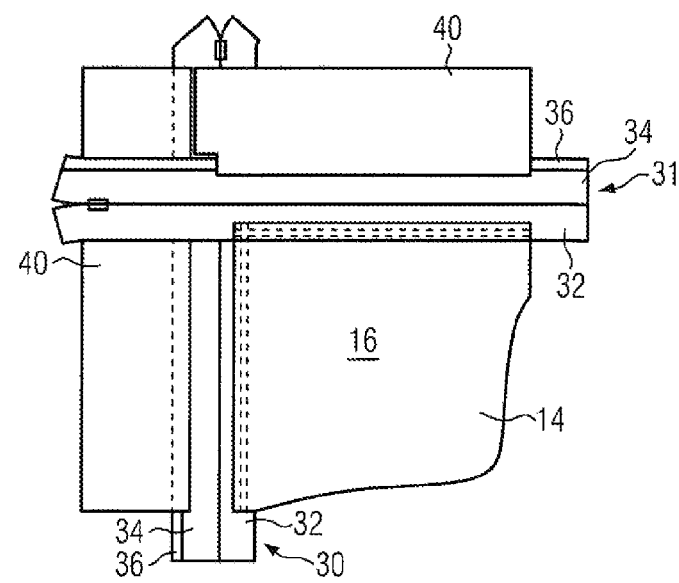
FIG. 19 is a detail showing a corner illustrated in FIG. 18.

FIG. 18 shows details of a biaxially taughtened membrane element 12. The illustration on the left-hand side of FIG. 18 shows the membrane element 12 in a slack state. The membrane element 12 comprises a zip fastener 30 along each of its two long sides and a zip fastener 31 along each of its two transverse sides. Like the zip fasteners 30, the zip fasteners 31 have each a first and second closure band 32, 34. In the illustration on the left-hand side of FIG. 18, the zip fasteners 30, 31 are open. In order to taughten the membrane element 12, said zip fasteners 30, 31 are closed, as shown on the right-hand side of FIG. 18.

The membrane element 12 comprises a face side 16 and a reverse side 17. The zip fasteners 20, 30, 31 are each attached to the reverse side 17 of the membrane 14, as shown, in particular, in FIGS. 13, 15 to 17, and 19.

Figure 20:
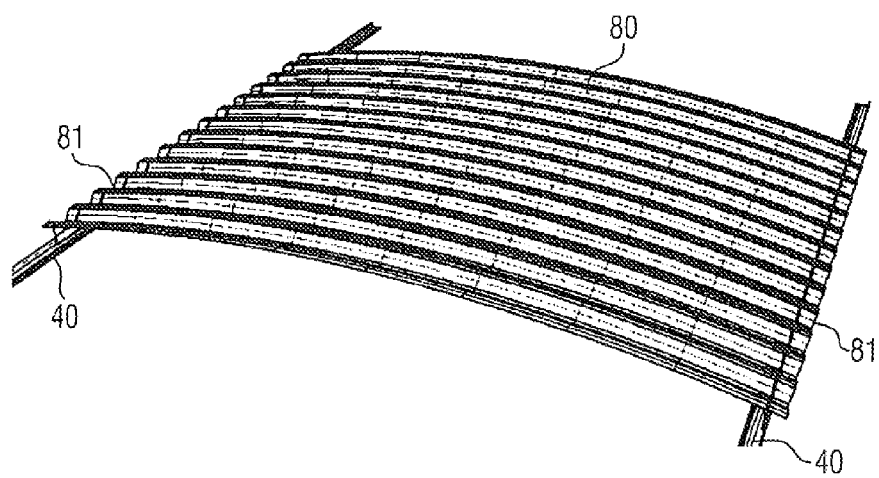
FIG. 20 is a perspective view of a protective cover including a corrugated sheet.

FIG. 20 shows a protective cover 80 with a plate or sheet which is curved in a lateral direction. The protective cover 80 can for example be an aluminum plate or sheet. For a controlled draining of condensation water the plate or sheet is formed as a corrugated or ripped plate or sheet, in particular having trapezoid corrugations. The water can be drained to the sides of the protective cover 80 through wave troughs. Protruding drip edges 81 prevent the water from reaching the membrane element 12. When the plane is horizontal, for example at take off, the wave troughs prevent the water from flowing in a longitudinal direction of the plane. At an underside of the plate or sheet, illuminants 88 are provided, in particular under the wave crests of the corrugated plate or sheet. Flanks of the waves can serve as reflectors for light distribution.

Figure 21:
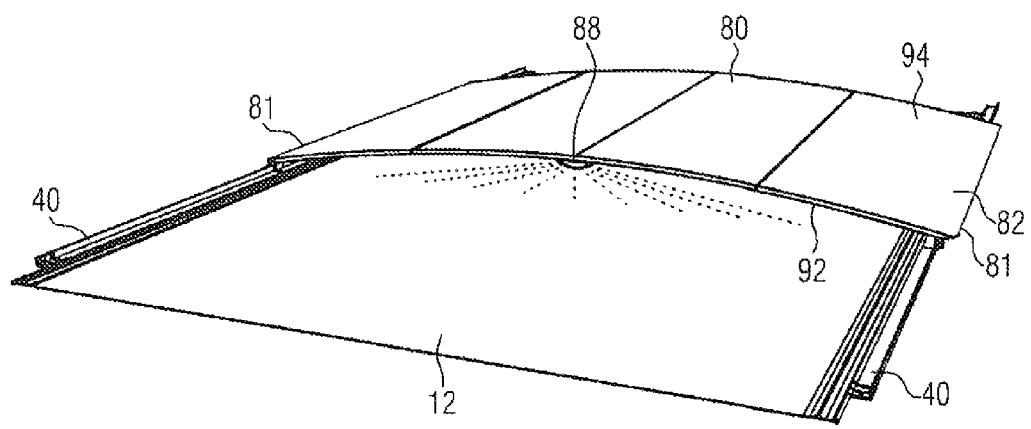
FIG. 21 is a perspective view of a protective cover including a frame being covered with a foil or membrane.

FIG. 21 shows a protective cover 80 with a dimensionally stable frame 92, for example of aluminum, to which a foil 94 or fabric, which can in particular be water resistant, is mounted. The frame 92 is curved in a direction transverse to a longitudinal axis. The side edges are formed as drip edges 81. Water can be drained to the sides. Sealings are provided between individual cover segments 82.

The lining of the invention forms an integrated ceiling system that can be directly mounted on, say, the frame of an aircraft fuselage or on fittings previously used for holding other ceiling components. The lining of the invention provides an optically attractive room closure, which is reliably protected by the protective cover. The lining can be mounted and dismounted in a simple manner and is highly functional due to the rigidity of the protective cover. The double zip fastener of the invention including the keder connection facilitates the taughtening process and provides simple means of accessing the protective cover, for example for inspection purposes.

The invention claimed is:

1. A lining for surfaces, comprising
at least two profiled frame elements extending in a longitudinal direction along the surface to be covered in spaced relationship to each other,
at least one membrane element having a face side and a reverse side remote from the face side and disposed between said profiled frame elements and connected to said profiled frame elements, at least partially, by means of attachment means that engage said membrane element from behind, wherein said membrane element, when in a loose state, is capable of moving freely in said longitudinal direction, and
means adapted to taughten said membrane element in a transverse direction between said profiled frame elements, comprising at least two vertically adjacent zip fasteners extending in the longitudinal direction and arranged such that closing of a first zip fastener of said at least two vertically adjacent zip fasteners produces a first, loose state of said membrane element between said profiled frame elements and subsequent closing of a second zip fastener of said at least two vertically adjacent zip fasteners causes a second, taughtened state of said membrane element between said profiled frame elements,
wherein, for protection of said membrane element, at least one dimensionally stable protective cover is provided on said reverse side for draining off condensation water that is formed on a top surface of the lining, the protective cover having at least one of an arched or curved cross-section,
wherein the protective cover covers an area that is larger than that of the membrane element and protrudes laterally beyond the membrane element,
and
wherein the protective cover includes at least one of a corrugated or ripped sheet or plate for draining water to the sides of the protective cover through wave troughs in the sheet or plate.

2. The lining according to claim 1, wherein
said protective cover has at least one illuminant.

3. The lining as defined in claim 1 or claim 2, wherein
said protective cover has at least one reflector.

4. The lining according to claim 1, wherein
said protective cover has at least one heat sink.

5. The lining according to any one of claim 1, wherein
said protective cover has a sound-absorbing coating.

6. The lining according to claim 1, wherein
said rearwardly engaging attachment means are formed by a keder joint.

7. The lining according to claim 1, wherein
said protective cover is fixed to said profiled frame elements.

8. The lining according to claim 1, wherein
securing elements are present, by means of which said profiled frame elements can be attached to an assembly base.

9. The lining according to claim 8, wherein
tension forces that are transferred from the stretched membrane element to said profiled frame elements can be absorbed by said assembly base via said securing elements.

10. The lining according to claim 1, wherein
tension forces that are transferred from the stretched membrane element to said profiled frame elements can be absorbed by said protective cover.

11. The lining according to claim 1, wherein
said protective cover has a plurality of cover segments which are positively attached to each other.

12. The lining according to claim 1, wherein
said profiled frame elements each have a plurality of profiled segments that are bonded to each other in the region of a moment zero point of said profiled frame elements.

13. The lining according to claim 1, wherein
said means for taughtening said membrane element comprise at least one adjusting means with which at least one of the profiled frame elements can be displaced in the transverse direction.

14. The lining according to claim 1, wherein
the protective cover comprises a corrugated plate or sheet or a frame which is covered with a foil or fabric.

15. A lining for surfaces, comprising
at least two profiled frame elements extending in a longitudinal direction along the surface to be covered in spaced relationship to each other,
at least one membrane element having a face side and a reverse side remote from the face side and disposed between said profiled frame elements and connected to said profiled frame elements, at least partially, by means of attachment means that engage said membrane element from behind, wherein said membrane element, when in a loose state, is capable of moving freely in said longitudinal direction, and
means adapted to taughten said membrane element in a transverse direction between said profiled frame elements, comprising a zip fastener and a bridging strap disposed across said zip fastener for joining closure bands of the zip fastener,
the zip fastener extending in the longitudinal direction and arranged such that closing of the zip fastener produces a first, taughtened state of said membrane element between said profiled frame elements and opening of the zip fastener produces a second, loose state of said membrane element between said profiled frame elements, the bridging strap disposed across said zip fastener restricting a size of a gap between the closure bands of the zip fastener when the zip fastener is in the second, loose state, wherein, for protection of said membrane element, at least one dimensionally stable protective cover is provided on said reverse side for draining off condensation water that is formed on a top surface of the lining, the protective cover having at least one of an arched or curved cross-section, wherein the protective cover covers an area that is larger than that of the membrane element and protrudes laterally beyond the membrane element, and wherein the protective cover includes at least one of a corrugated or ripped sheet or plate for draining water to the sides of the protective cover through wave troughs in the sheet or plate.

* * * * *